United States Patent Office 3,555,031
Patented Jan. 12, 1971

3,555,031
HALOPHENYL-PYRIDINES
Frank Long, Llangollen, and Kamal Naguib Ayad, Wreham, Wales, assignors to Monsanto Chemicals Limited, London, England, a British company
No Drawing. Filed June 30, 1967, Ser. No. 650,176
Int. Cl. C07d *31/20, 31/22*
U.S. Cl. 260—290          8 Claims

ABSTRACT OF THE DISCLOSURE

Substituted-pyridines selected from the group consisting of (1) a pyridine base,
(2) acid addition salts of (1),
(3) quaternary ammonium salts of (1), and
(4) N-oxides of (1), said pyridine base having at least one aromatic group as a substitute in the pyridine nucleus and at least one other substitutent in the pyridine nucleus selected from the group consisting of halogen, cyano, amino, acylamino, hydroxyl, mercapto, aliphatic, aliphatic-oxy, aliphatic-thio and aliphatic sulphonyl groups, provided that when the pyridine nucleus contains both a chlorine atom and a cyano group an aromatic group is present in an α- or β-position of the pyridine nucleus and further provided that when the pyridine nucleus contains an aliphatic group, there is also present in the pyridine nucleus at least one additional substituent selected from the said other substituents.

---

This invention relates to substituted pyridines, and the salts and N-oxides thereof which are useful as phytotoxicants, and to processes for making them. This invention further relates to phytotoxic compositions and to methods of controlling the growth of plants.

The term "phytotoxicant" as used herein and in the appended claims means materials which (1) effectively control all plants in a given locus or (2) selectively control the growth of one or more plant species in the presence of other plants. In like manner, "phytotoxic" and "phytotoxicity" are used to identify the overall and selective control activity of the compounds and compositions of this invention.

The term "plant" as used herein and in the appended claims is inclusive of dormant seeds, garminant seeds, germinative seeds, emerging seedlings and established woody and herbaceous vegetation including the roots and above-ground portions.

The term "control" as used herein and in the appended claims is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

The substituted-pyridines of this invention are selected from the group consisting of (1) a pyridine base,
(2) acid addition salts of (1),
(3) quaternary ammonium salts of (1), and
(4) N-oxides of (1), said pyridine base having at least one aromatic group as a substitute in the pyridine nucleus and at least one other substituent in the pyridine nucleus selected from the group consisting of halogen, cyano, amino, acylamino, hydroxyl, mercapto, aliphatic, aliphatic-oxy, aliphatic-thio and aliphatic sulphonyl groups, provided that when the pyridine nucleus contains both a chlorine atom and a cyano group an aromatic group is present in an α- or β-position of the pyridine nucleus and further provided that when the pyridine nucleus contains an aliphatic group, there is also present in the pyridine nucleus at least one additional substituent selected from the said other substituents.

In the substituted-pyridines of this invention, each aromatic substituent in the pyridine nucleus is usually one having a carbocyclic skeleton, for instance a phenyl or substituted phenyl group, but it can be a hetero-aromatic group, for instance thienyl, furyl, or pyridyl group or one of these groups having one or more substituents.

Preferably at least one aromatic substituent in the pyridine nucleus of the present substituted pyridines is a haloaryl group, for example halophenyl, halotolyl, halonaphthyl or halobiphenylyl. Where the number of halogen atoms permits there can also be present in such haloaryls one or more other nuclear substituents, and these are generally selected from the additional substituents in the pyridine nucleus as defined above. The halogen in a haloaryl group is usually chlorine or bromine but it can be fluorine or iodine.

With reference to the other groups from which the additional substituent or substituents in the pyridine nucleus can be selected, an acylamino group is usually one derived from a carboxylic acid, for example an acetylamino, propionylamino or benzoylamino group, but it also can be one derived from a sulphonic acid, for example a benzenesulphonylamino group.

The aliphatic group and the aliphatic portion of an aliphatic-oxy, aliphatic-thio or aliphatic sulphonyl group can be saturated or unsaturated, open chain or cyclic, substituted or unsubstituted. Examples are alkyl and alkenyl containing from 1 to 20 carbon atoms, particularly those containing from 1 to 6 carbon atoms, for example, methyl, ethyl, isopropyl, β-allyl, secbutyl and hexyl; cycloalkyl and alkylcycloalkyl, particuarly those containing from 5 to 10 carbon atoms, for example cyclopentyl, cyclohexyl and methylcyclohexyl; and halogen- and cyano-substituted alkyl and alkenyl groups particularly those containing from 1 to 6 carbon atoms, for example chloromethyl, trichloromethyl, trifluoromethyl, β-bromoethyl, β-cyanoethyl, 2,3-dibromopropyl, and β-chloro-β-allyl.

The preferred substituted-pyridines of this invention are selected from the group consisting of (1) pyridine bases,
(2) acid addition salts of (1),
(3) quaternary ammonium salts of (1), and
(4) N-oxides of (1), said pyridine base having the formula

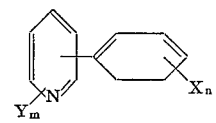

wherein X is selected from the group consisting of chlorine and bromine, $n$ is an integer from 3 to 5 inclusive, Y is selected from the group consisting of chlorine, bromine, hydroxyl and alkoxy of not more than 6 carbon atoms, and $m$ is an integer from 1 to 2, provided that when Y is hydroxyl or alkoxy, $m$ is an integer of 1.

In the above formula, the halophenyl group is preferably attached to the pyridine ring at the 3- or 5-position and the Y substituent is preferably attached to the pyridine ring at the 2-position.

Specific examples of the substituted pyridines of this invention include the following:

2-chloro-5(2′,4′-dichlorophenyl)pyridine;
2-chloro-5(3′,5′-dichloro-4′-methoxyphenyl) pyridine;
2-chloro-3(2′,4′6′-trichlorophenyl) pyridine;
2-chloro-5(2′,4′,6′-trichlorophenyl) pyridine;
2-chloro-5(2,4′,6′-trichlorophenyl) pyridine hydrochloride;
benzyl 2-chloro-5(2′,4′,6′-trichlorophenyl) pyridinium chloride;
methyl 2-chloro-5-(2′,4′,6′-trichlorophenyl) pyridinium iodide;
n-heptyl 2-chloro-5(2′,4′,6′-trichlorophenyl pyridinium iodide;
2-chloro-6(2′,4′,6′-trichlorophenyl) pyridine;
4-chloro-3(2′,4′,6′-trichlorophenyl) pyridine;
4-chloro-5(2′,4′,6′-trichlorophenyl) pyridine;
the N-oxides of the aforementioned chloro-(2′,4′,6′-trichlorophenyl) pyridines;
2-chloro-5(2′,4′,6′-tribromophenyl) pyridine;
2-bromo-5(2′,4′,6′-trichlorophenyl) pyridine;
2-bromo-5(2′,4′,6′-tribromophenyl) pyridine;
2-fluoro-5(2′,4′,6′-trichlorophenyl) pyridine;
2-chloro-5(pentachlorophenyl) pyridine;
2-substituted-5(2′,4′,6′-trichlorophenyl) pyridines where the 2-substituent is a cyano, trifluoromethyl, amino, acetylamino, hydroxy, methyl, methoxy, propoxy, $\beta$-chloro-ethoxy, $\beta$-alloyloxy, methylthio, propylthio, trifluoromethylthio group or trichloromethylsulphonyl group;
2-chloro-5(2′,4′,6′-trichlorophenyl)-3-substituted pyridines where the 3- substituent is a chlorine or bromine atom or an ethyl, cyano, trifluoromethyl, amino, acetylamino, ethoxy, propoxy, methylthio or n-butyl-sulphonyl group;
2-chloro-3,5-bis(2′,4′,6′-trichlorophenyl) pyridine; and 2,6-dichloro-3,5-bis(2′,4′,6′-trichlorophenyl) pyridine.

The substituted-pyridines of this invention can be prepared by a process which comprises reacting a pyridine sulphonyl halide with an aromatic compound having at least one nuclear hydrogen atom under conditions that sulphur dioxide and a hydrogen halide are evolved and an aromatic group derived by the loss of a nuclear hydrogen atom from the aromatic compound is introduced into the pyridine nucleus in a position originally occupied by a sulphonyl halide group, the pyridine sulphonyl halide being one in which the substituents in the pyridine nucleus of the final product substituted pyridines other than the aromatic group or groups introduced by the process are already present.

The preferred pyridine sulphonyl halides are the sulphonyl chloride, although the sulphonyl bromides can also be used. The pyridine sulphonyl halide contains one or more sulphonyl halide groups depending on the number of aromatic groups required in the substituted-pyridine.

The process is usually carried out at temperatures above about 150° C. with temperatures from about 200° C. to about 300° C. preferred.

An excess of the aromatic compound relative to the pyridine sulphonyl halide is usually employed to obtain pure product and to achieve a high conversion of the sulphonyl halide.

The conditions under which the above process can be carried out are described in more detail in British Pat. Nos. 919,988 and 959,605.

The substituted-pyridine salts can be obtained from the free base in any conventional manner, e.g. by treatment of the substituted pyridine base with the appropriate acid where the salt is an acid addition salt, or with the appropriate quaternizing agent, for instance an alkyl or aralkyl halide, where the salt is a quaternary pyridinium salt.

Acids which con be used to prepare acid addition salts of the substituted pyridines of this invention include, for example, inorganic acids such as hydrochloric acid, hydrobromic acid, sulfuric acid, phosphoric acid, nitric acid, and the like and organic acids such as acetic acid, trichloroacetic acid, benzoic acid, 2,4-dinitrobenzoic acid, succinic acid, tartaric acid, phthalic acid, and the like. The alkyl group attached to the nitrogen atom of the pyridine ring in an alkyl pyridinium salt is of not more than 20 carbon atoms, and the aralkyl group in an aralkyl pyridinium salt can be, for example, a benzyl or alkyl-substituted benzyl group.

The N-oxides can be obtained from the substituted pyridine bases by oxidation, using for example, a per-oxide or peracid, for instance a per-carboxylic acid such as peracetic acid. The N-oxide of a substituted-pyridine containing a substituent sensitive to oxidation can usually be obtained from a pyridine N-oxide containing a precursor of the oxidation-sensitive substituent by a conventional replacement reaction. Alternatively the N-oxides can be obtained by the use in the process of the invention of a pyridine sulphonyl halide N-oxide.

In accordance with one embodiment of this invention it has been found that the growth of dormant seeds, germinant seeds, germinative seeds, emerging seedlings, and established woody and herbaceous vegetation can be controlled by exposing the seeds, emerging seedlings, or the roots or above-ground portions of established vegetation to the action of an effective amount of any substituted-pyridine of the present invention. The substituted-pyridines can be used as individual compounds, as admixtures of two or more compounds, or in admixture with an adjuvant. These compounds are effective as general phytotoxicants, including post-emergent phytotoxicants and pre-emergent phytotoxicants, but their most outstanding utility is as selective pre-emergent phytotoxicants, e.g. the selective control of the growth of one or more monocotyledonous species and/or one or more dicotyledonous species in the presence of other monocotyledons and/or dicotyledons. Furthermore, these compounds are characterized by broad spectrum activity; i.e. they modify the growth of a wide variety of plants including but not limited to ferns, conifers (pine, fir and the like), monocotyledons and dicotyledons.

For the sake of brevity and simplicity, the term "active ingredient" will be used hereinafter to describe the present substituted-pyridines.

The phytotoxic compositions of this invention contain at least one active ingredient and an adjuvant in liquid or solid form. The compositions are prepared by admixing the active ingredient with an adjuvant including diluents, extenders, carriers and conditioning agents to provide compositions in the form of finely-divided particulate solids, granules, pellets, solutions, dispersions or emulsions. Thus the active ingredient can be used with an adjuvant such as a finely-divided solid, a liquid of organic origin, water, a wetting agent, a dispersing agent, an emulsifying agent or any suitable combination of these.

Typical finely-divided carriers and extenders for the plant growth regulant compositions of this invention include by way of example the talcs, clays, pumice, silica, diatomaceous earth, walnut flour, chalk, quartz, Fuller's earth, salt, sulfur, powdered cork, powdered wood, charcoal, ground corn cobs, illite clay, tobacco dust, volcanic ash, cottonseed hulls, wheat flour, soybean flour, tripoli and the like. Typical liquid diluents include water, kerosene, Stoddard solvent, hexane, toluene, benzene, acetone, ethylene dichloride, xylene, alcohols, Diesel oil glycols and the like.

The phytotoxic compositions of this invention, particularly liquids and wettable particles, usually contain as a conditioning agent one or more surface-active agents in amounts sufficient to render a given composition readily dispersible in water or in oil. By the term "surface-active agent" it is understood that wetting agents, dispersing agents, suspending agents and emulsifying agents are included therein.

The term "phytotoxic composition" as used herein and in the appended claims is intended to mean not only compositions in a suitable form for application but also concentrated compositions which require dilution or extension with a suitable quantity of liquid or solid adjuvant prior to application.

The following examples will illustrate the invention. In the following examples as well as in the specification and appended claims, parts and percent are by weight unless otherwise indicated.

EXAMPLE 1

This example describes the preparation of 2-chloro-5(2',4',6'-trichlorophenyl) pyridine.

A mixture of 10.6 parts of 2-chloropyridine-5-sulphonyl chloride, 136.2 parts of 1,3,5-trichlorobenzene and 0.05 part of cuprous chloride was heated at reflux with stirring; sulphur dioxide and hydrogen chloride were evolved. These gases were entrained in a stream of dry nitrogen passing over the reaction mixture, and were absorbed in aqueous sodium hydroxide solution. After 5 hours, the amounts of sulphur dioxide and hydrogen chloride evolved corresponded respectively to 69% and 78% of the theoretical, and refluxing was discontinued. The reaction mixture was distilled under reduced pressure through a 6 inch Fenske column, giving a first fraction boiling up to 92° C. at a pressure of 16 mm. of mercury and consisting essentially of recovered starting material, and crude 2-chloro-5(2',4',6'-trichlorophenyl) pyridine as a second fraction, 6.9 parts, having a boiling range of 140–144° C. at a pressure of 0.15 mm. of mercury. The product was purified by redistillation, the main fraction of the distillate (5.2 parts) being obtained as an oil which solidified on standing to crystals having a melting point of 82–84° C.

Calc'd for $C_{11}H_5Cl_4N$ (percent): C, 45.1; H, 1.72; Cl, 48.5; N, 4.5. Found (percent): C, 45.0; H, 1.9; Cl, 48.85; N, 4.5.

EXAMPLE 2

This example illustrates the phytotoxicity of the active ingredient described in Example 1.

In the test used to assess the effectivenes of the active ingredient as a pre-emergent phytotoxicant, seeds of several plant species were sown in green-house boxes. After sowing, either (a) the seeds were covered with soil containing the active ingredient, or (b) the seeds were covered with ordinary soil and the surface of the soil was sprayed with an aqueous dispersion containing the active ingredient to be tested at a rate equivalent to 2 pounds of the active ingredient per acre. The boxes were kept irrigated, and observation of growth was carried out at intervals. The test was repeated at a series of lower application rates of the active ingredient.

The plants to which 2-chloro-5(2',4',6'-trichlorophenyl) pyridine was severely phytotoxic at application rates as low as ¼ pound per acre included crab grass and pigweed. At 1 pound per acre it also effectively controlled the growth of wild oat brome, smartweed, lambsquarter, coffee wed and velvet leaf, while at the same application rate it had little or not effect on the growth of cotton, corn and soya bean.

EXAMPLE 3

This example describes the preparation of 2-chloro-3-(2',4',6'-trichlorophenyl) pyridine.

2-chloro-pyridine 3-sulphonyl chloride (0.1 mol) was heated under reflux with 1.5 mol of trichlorobenzene and 0.05 gram of cuprous chloride. The reaction mixture was stirred and a stream of dry nitrogen was passed over it to carry the sulphur dioxide and hydrogen chloride evolved into a trap of aqueous sodium hydroxide. The amounts of sulphur dioxide and hydrogen chloride are determined by titration of liberated iodine against sodium thiosulphate and titration against standard silver nitrate respectively.

After a reaction time of 6¾ hours the amounts of sulphur dioxide and hydrogen chloride evolved were 96.7% and 91% of the theoretical. The product had a boiling point of 144–145° C. at 0.3 mm. of mercury and a melting point of 92–95° C. The yield was 19.2 grams which represents 65.5% of the theoretical.

Calc'd for $C_{11}H_5NCl_4$ (percent): C, 45.1; H, 1.5; N, 4.7; Cl, 48.5. Found (percent): C, 45.8; H, 1.9; N, 4.9; Cl, 47.4 (by difference).

EXAMPLE 4

This example describes the preparation of 2-propoxy-5-(2',4',6'-trichlorophenyl) pyridine.

A solution of sodium propoxide in propyl alcohol was prepared by dissolving 0.46 part of sodium in 30 parts of propyl alcohol dried with magnesium dipropoxide. 2-chloro-5(2',4',6'-trichlorophenyl) pyridine, 5.8 parts, was added to the above solution and the mixture was heated under reflux in an atmosphere of nitrogen for 24 hours. After cooling to room temperature, 1.1 parts of sodium chloride was removed by filtration. 1.17 parts is the theoretical yield.

The filtrate was added to 200 parts of water and the oil produced was separated. The aqueous layer was extracted with two 100 part quantities of ether and the combined oil and extracts were dried over magnesium sulphate. The residue, after removing the ether amounted to 5.9 parts representing 93.2% of the theoretical yield. It was purified by distillation at 161° C. and 0.7 mm. pressure.

The pure product weighed 5.0 parts which represents 78.9% of the theoretical yield.

Calc'd for $C_{14}H_{12}Cl_3NO$ (percent): C, 53.05; H, 3.79; N, 4.42; Cl, 33.64. Found (percent): C, 52.14; H, 3.65; N, 4.52; Cl, 34.3.

EXAMPLE 5

This example describes the preparation of 2-hydroxy-5-(2',4',6'-trichlorophenyl) pyridine.

2 - chloro - 5 - (2',4',6' - trichlorophenyl) pyridine (0.02 mol) and 0.1 mol of potassium hydroxide were ground together to a fine powder. The mixture was then heated at 175° C. for 2 hours and poured hot into 100 cc. of water. The solid which came down was filtered off and dried. Part of the product was purified and gave a compound having a melting point of 246–248° C. and an elemental analysis corresponding to that calculated for 2-hydroxy-5-(2',4',6'-trichlorophenyl) pyridine.

EXAMPLE 6

This example describes the preparation of 2-methoxy-5-(2',4',6'-trichlorophenyl) pyridine.

The process of the reaction is as described in Example 4. The filtrate obtained after filtering off the sodium chloride on standing gave 1.5 grams of an oil which was isolated. The alcoholic solution from which the oil separated was diluted with 200 cc. of water and more oil separated. On cooling and scratching part of this oil solidified. The remainder of the oil in the alcohol/water mixture was extracted with two 100 cc. quantities of ether and the extracts were combined with the 1.5 grams of oil which had previously separated from the alcoholic solution and dried over magnesium sulphate. The solvent was then removed and the residue, which weighed 2.4 grams, was purified by distillation. The boiling point of the product was 144° C. at 0.6 mm. pressure. The yield, which represented 34.7% of the consumed 2-chloro-5-(2',4',6'-trichlorophenyl) pyridine, was 1.7 grams. The infrared spectrum obtained and the analysis of the product gave results consistent with the compound 2-methoxy - 5(2',4',6'-trichlorophenyl) pyridine.

EXAMPLE 7

This example describes the preparation of 4-chloro-3-(2',4',6'-trichlorophenyl) pyridine.

4-chloro-pyridine-3-sulphonyl chloride, 0.027 mol, and 0.4 mol of 1,3,5-trichlorobenzene were stirred and heated at reflux in the presence of 1 gram of cuprous chloride for a period of 5 hours. The sulphur dioxide and hydrogen chloride formed in the reaction were carried over by a stream of nitrogen into a sodium hydroxide trap. The amounts of the two gases evolved were 60% and 58% respectively of the theoretical. The product which weighed 2.2 grams, representing a yield of 53.6% of the theoretical, had a boiling point of 134° C. at 0.7 mm. pressure and melted at 81° C.

Calc'd for $C_{11}H_5Cl_4N$ (percent): C, 45.1; H, 1.7; Cl, 48.8; N, 4.7. Found (percent): C, 45.2; H, 1.66; Cl, 47.67 (by difference); N, 5.47.

EXAMPLE 8

This example describes the preparation of 2-bromo-5-(2',4',6'-tribromophenyl) pyridine.

2-bromopyridine-5-sulphonyl chloride, 0.027 mol, was reacted with 1,3,5-tribromobenzene according to the process described in Example 3. After a reaction time of 5½ hours, the amounts of sulphur dioxide and hydrogen chloride evolved were, respectively, 97% and 91.5% of the thoretical. The product obtained boiled at 180–182° C. at a pressure of 0.1 mm. and melted at 73° C. The yield was 7 grams which represented 55% of the theoretical.

Calc'd for $C_{11}H_5Br_4N$ (percent): C, 28.9; H, 1.06; Br, 68.1; N, 2.8. Found (percent): C, 27.98; H, 0.88; Br, 68.12 (by difference); N, 3.0.

EXAMPLE 9

This example describes the preparation of 2-chloro-5-(pentachlorophenyl) pyridine.

2-chloropyridine-5-sulphonyl chloride, 0.072 mol, was reacted with 1.14 mol of pentachlorobenzene according to the process described in Example 3. After a reaction time of 8½ hours the amounts of $SO_2$ and HCl evolved were 99.6% and 51.5% respectively of the theoretical. The product boiled at 184–186° C. at a pressure of 0.6–0.7 mm. of mercury and melted at 105–110° C. The yield, which was 7.5 grams represented 28.8% of the theoretical.

Calc'd for $C_{11}H_3Cl_6N$ (percent): C, 36.2; H, 0.83; Cl, 59.1, N, 3.87. Found (percent): C, 36.39; H, 0.87; Cl, 58.68 (by difference); N, 4.16.

EXAMPLE 10

This example describes the preparation of 2-chloro-3-bromo-5(2',4',6'-trichlorophenyl) pyridine.

2-chloro-3-bromopyridine - 5-sulphonyl chloride, 0.021 mol, were reacted with 0.305 mol of 1,3,5-trichlorobenzene according to the process described in Example 3. After a reaction time of 21 hours the amounts of sulphur dioxide and hydrogen chloride evolved were 48.2% and 33.3% respectively of the theoretical. The product boiled at 178° C. at a pressure of 0.7 mm. of mercury and melted at 65° C. The yield represented 33.3% of the theoretical.

Calc'd for $C_{11}H_4BrCl_4N$ (percent): C, 35.48; H, 1.07; N, 3.76. Found (percent): C, 35.01; H, 1.08; N, 4.0.

EXAMPLE 11

This example describes the preparation of 2-chloro-5-(2',4',6'-tribromophenyl) pyridine.

2-chloropyridine-5-sulphonyl chloride, 0.05 mol, was reacted with 0.65 mol of 1,3,5-tribromobenzene in the manner described in Example 3. After a reaction time of 5½ hours, the amounts of sulphur dioxide and hydrochloric acid evolved were, respectively, 86.5% and 85% of the theoretical. The product obtained boiled at 192–194° C. at a pressure of 0.6 mm. of mercury and melted at 75–78° C. After redistillation the product boiled at 164° C. under 0.15 mm. pressure and melted at 78–80° C. The yield was 6.0 grams, representing 28.1% of the theoretical.

Calc'd for $C_{11}H_5Br_3ClN$ (percent): C, 30.99; H, 1.17; Br, 56.27; Cl, 8.3; N, 3.28. Found (percent): C, 29.5; H, 1.11; Br, 63.65; Cl, 2.67; N, 3.4.

EXAMPLE 12

This example describes the preparation of 2-chloro-5-(2',4',6'-trichlorophenyl) pyridine-N-oxide.

A mixture of 3 grams of 2-chloro-5(2',4',6'-trichlorophenyl) pyridine and 35 cc. of 40% solution of peracetic acid in acetic acid was heated at 50–60° C. 5 days and then left standing at room temperature for 3 weeks. The mixture was then filtered and reduced to a volume of about 5 cc., diluted with 100 cc. of water and extracted with three 50 cc. quantities of chloroform. The combined extracts were washed with sodium bicarbonate and sodium sulphite solutions and dried. The residue, after removal of the solvent, weighed 2.2 grams, which represents a yield of 71.1% of the theoretical. After two recrystallizations from methanol the melting point of the product was found to be 192–194° C.

Calc'd for $C_{11}H_5Cl_4NO$ (percent): C, 42.6; H, 1.16; Cl, 46.0; N, 4.5. Found (percent): C, 42.99; H, 1.17; Cl, 45.6; N, 4.23.

The pre-emergent phytotoxic activity of illustrative active ingredients of this invention is demonstrated as follows:

A good grade of top soil is placed in aluminum pans and compacted to a depth of ⅜″ to ½″ from the top of each pan. A predetermined number of seeds of each of various plant species are placed on top of the soil in each pan. The soil required to fill the pans is weighed and admixed with a phytotoxic composition containing a known amount of active ingredient. The pans are then filled with the admixture and leveled. Watering is carried out by permitting the soil in the pans to absorb moisture through the apertured bottom of the pans. The seed containing pans are placed on a wet sand bench and maintained for approximately 14 days under ordinary conditions of sunlight and watering. The plants are observed at the end of approximately 14 days and the results recorded.

The pre-emergent phytotoxic activity of the active ingredients is measured by the average percent control of each seed lot. The average percent germination is converted to a relative numerical scale for the sake of brevity and simplicity in the examples. The pre-emergent phytotoxic activity index used in Table I is defined as follows:

| Average percent control | Numerical scale |
|---|---|
| 0–25 | 0 |
| 26–50 | 1 |
| 51–75 | 2 |
| 76–100 | 3 |

The pre-emergent phytotoxic activity of some of the active ingredients of this invention is recorded in Table I for various application rates of the active ingredients. In Table I, the various plant seeds are represented by letters as follows:

| | |
|---|---|
| A—Cotton | I—Brome |
| B—Corn | J—Pigweed |
| C—Soybean | K—Barnyard Grass |
| D—Cocklebur | L—Sugar Beet |
| E—Crab Grass | M—Wheat |
| F—Lambsquarter | N—Velvet Leaf |
| G—Wild Oats | O—Rice |
| H—Smartweed | P—Coffee Weed |

TABLE I.—PRE-EMERGENCE PHYTOTOXIC ACTIVITY

| Active ingredient | Application rate, lb./acre | A | B | C | D | E | F | G | H | I | J | K | L | M | N | O | P |
|---|---|---|---|---|---|---|---|---|---|---|---|---|---|---|---|---|---|
| Example: | | | | | | | | | | | | | | | | | |
| 3 | 4 | 1 | 0 | 1 | ---- | 3 | 1 | 3 | 1 | 3 | 3 | 3 | 2 | 1 | 1 | 3 | 1 |
| 4 | 4 | 0 | 3 | 0 | 0 | 3 | 3 | 3 | 3 | 3 | 3 | 3 | 2 | 2 | 3 | 1 | 3 |
|  | 2 | 0 | 2 | 0 | ---- | 3 | 3 | 1 | 2 | 2 | 3 | 2 | 1 | 1 | 2 | 1 | 2 |
| 5 | 2 | 1 | 0 | 0 | 0 | 0 | 1 | 0 | 2 | 0 | 3 | 0 | 2 | 0 | 1 | 0 | 0 |
| 6 | 2 | 0 | 1 | 0 | 0 | 3 | 3 | 3 | 3 | 3 | 3 | 2 | 3 | 2 | 3 | 2 | 2 |
|  | 1 | 0 | 1 | 0 | 0 | 3 | 3 | 2 | 2 | 3 | 3 | 2 | 2 | 1 | 2 | 1 | 2 |
| 8 | 2 | 0 | 0 | 0 | 0 | 3 | 3 | 1 | 0 | 3 | 3 | 0 | 1 | 0 | 0 | 2 | 0 |
| 11 | 2 | 1 | 0 | 0 | ---- | 3 | 3 | 1 | 1 | 3 | 3 | 1 | 0 | 0 | 1 | 2 | 2 |

The post-emergent phytotoxic activity of various substituted-pyridines of this invention is demonstrated as follows: The active ingredients are applied in spray form to 21-day old specimens of the same plant species used in the preceding pre-emergent tests. The spray is an acetone-water solution containing 0.5% active ingredient. The solution is applied to the plants in different sets of pans at a rate equal to approximately 10 pounds of active ingredient per acre. The treated plants are placed in a greenhouse and the effects are observed and recorded after approximately 14 days.

The post-emergent phytotoxic activity index used in Table II is measured by the average percent control of each plant species and is defined as follows:

| Average percent control | Numerical scale |
|---|---|
| 0–25 | 0 |
| 26–50 | 1 |
| 51–75 | 2 |
| 76–99 | 3 |
| 100 | 4 |

The identification of the plants used is the same as in the preceding pre-emergent tests. Results and further details are given in Table II.

TABLE II.—POST-EMERGENT PHYTOTOXIC ACTIVITY

| Active ingredient | General grass [1] | General broad-leaf [1] |
|---|---|---|
| Example: | | |
| 6 | 0 | 2 |
| 10 | 0 | 2 |
| 12 | 0 | 2 |

[1] Average calculated from results with individual grass and individual broadleaf species.

As mentioned hereinbefore the phytotoxic compositions of this invention comprise an active ingredient and one or more adjuvants which can be solid or liquid extenders, carriers, diluents, conditioning agents and the like. Preferred phytotoxic compositions containing the active ingredients of this invention have been developed so that the active ingredients can be used to the greatest advantage to control the growth of plants. The preferred compositions comprise wettable powders, aqueous suspensions, dust formulations, granules, emulsifiable oils and solutions in solvents. In general, these preferred compositions can all contain one or more surface-active agents.

Surface-active agents which can be used in the phytotoxic compositions of this invention are set out, for example in Searle U.S. Pat. 2,426,417, Todd U.S. Pat. 2,655,447, Jones U.S. Pat. 2,412,510 and Lenher U.S. Pat. 2,139,276. A detailed list of such agents is also set forth by J. W. McCutcheon in "Soap and Chemical Specialties," November 1947, page 8011 et seq., entitled "Synthetic Detergents"; "Detergents and Emulsifiers—Up to Date" (1960), by J. W. McCutcheon, Inc., and Bulletin E-607 of the Bureau of Entomology and Plant Quarantine of the U.S.D.A. In general, less than 50 parts by weight of the surface active agent is present per 100 parts by weight of phytotoxic composition.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, ditertiary acetylinic glycols, polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions of this invention usually contain from about 5 to about 95 parts by weight of active ingredient, from about 0.25 to 25 parts by weight of wetting agent, from about 0.25 to 25 parts by weight of dispersant and from 4.5 to about 94.5 parts by weight of inert solid extender, all parts being by weight of the total composition. Where required from about 0.1 to 2.0 parts by weight of the solid inert extender can be replaced by a corrosion inhibitor or anti-foaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dusts are dense finely-divided particulate compositions which are intended for application to the soil in dry form. Dusts are characterized by their free-flowing and rapid settling properties so that they are not readily wind-borne to areas where they are of no value. Dusts contain primarily an active ingredient and a dense, free-flowing finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be either of vegetable or mineral origin. The solid extenders are characterized by possessing relatively low surface areas and are poor in liquid absorption. Suitable inert solid extenders for phytotoxic dusts include micaceous talcs, pyrophyllite, dense kaolin clays, ground calcium phosphate rock and tobacco dust. The dusts usually contain from about 0.5 to 95 parts active ingredient, 0 to 50 parts grinding aid, 0 to 50 parts wetting agent and 5 to 99.5 parts dense solid extender, all parts being by weight and based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. Suitable surface active agents are anionic, cationic and non-ionic such as alkyl aryl polyethoxy alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 50 parts surface active agent and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surface active agent such as those listed hereinbefore under wettable powders can be present in the composition. Natural clays, pyrophyllites, illite and vermiculite are examples of operable classes of particulate mineral extenders. The preferred extenders are the porous, absorptive, preformed particles such as preformed and screen particulate attapulgite or heat expanded, particulate vermiculite, and the finely-divided clays such as kaolin clays, hydrated attapulgite or bentonitic clays. These extenders are sprayed or blended with the active ingredient to form the phytotoxic granules.

The mineral particles which are used in the granular phytotoxic compositions of this invention usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the present granular compositions. The term "mesh" as used herein means U.S. Sieve Series.

The granular phytotoxic compositions of this invention generally contain from about 5 parts to about 30 parts by weight of active ingredient per 100 parts by weight of clay and 0 to about 5 parts by weight of surface active agent per 100 parts by weight of particulate clay. The preferred granular phytotoxic compositions contain from about 10 parts to about 25 parts by weight of active ingredient per 100 parts by weight of clay.

The phytotoxic compositions of this invention can also contain other additaments, for example fertilizers, phytotoxicants, other plant growth regulants, pesticides and the like used as adjuvant or in combination with any of the above-described adjuvants. Chemicals useful in combination with the active ingredients of this invention include for example triazines, ureas, carbamates, acetamides, acetanilides, uracils, acetic acids, phenols, thiolcarbamates, triazoles, benzoic acids, nitriles and the like such as:

3-amino-2,5-dichlorobenzoic acid
3-amino-1,2,4-triazole
2-methoxy-4-ethylamino-6-isopropylamino-s-triazine
2-chloro-4-ethylamino-6-isopropylamino-s-triazine
2-chloro-N,N-diallylacetamide
2-chloroallyl diethyldithiocarbamate
N'-(4-chlorophenoxy) phenyl-N,N-dimethylurea
isopropyl N-(3-chlorophenyl)carbamate
2,2-dichloropropionic acid
S-2,3-dichloroallyl N,N-diisopropylthiolcarbamate
2-methoxy-3,6-dichlorobenzoic acid
2,6-dichlorobenzonitrile
N,N-dimethyl-2,2-diphenylacetamide
6,7-dihydrodipyrido(1,2-a:2',1'-c)-pyrazidiinium salt
3-(3,4-dichlorophenyl)-1,1-dimethylurea
4,6-dinitro-o-sec-butylphenol
2-methyl-4,6-dinitrophenol
ethyl N,N-dipropylthiolcarbamate
2,3,6-trichlorophenylacetic acid
5-bromo-3-isopropyl-6-methyluracil
3-(3,4-dichlorophenyl)-1-methoxy-1-methylurea
2-methyl-4-chlorophenoxyacetic acid
3-(p-chlorophenyl)-1,1-dimethylurea
1-butyl-3-(3,4-dichlorophenyl)-1-methylurea
N-1-naphthylphthalamic acid
1,1'-dimethyl-4,4'-bipyridinium salt
2-chloro-4,6-bis(isopropylamino)-s-triazine
2-chloro-4,6-bis(ethylamino)-s-triazine
2,4-dichlorophenyl-4-nitrophenyl ether
α,α,α-trifluoro-2,6-dinitro-N,N-dipropyl-p-toluidine
S-propyl dipropylthiolcarbamate
2,4-dichlorophenoxyacetic acid
N-isopropyl-2-chloroacetanilide
2',6'-diethyl-N-methoxymethyl-2-chloroacetanilide Fertilizers useful in combination with the active ingredients include for example ammonium nitrate, urea, potash, and superphosphate. Other useful additaments include materials in which plant organisms take root and grow such as compost, manure, humus, sand and the like.

When operating in accordance with the present invention, effective amounts of the active ingredients are dispersed in or on soil or plant growth media and/or applied to above ground portions of plants by any convenient method. Application to the soil or growth media can be carried out by simply admixing with the soil, by applying to the surface of the soil and thereafter dragging or discing into the soil to the desired depth, or by employing a liquid carrier to accomplish the penetration and impregation. The application of liquid and particulate solid phytotoxic compositions to the surface of soil or to above ground portions of plants can be carried out by conventional methods, e.g. power dusters, boom and hand sprayers and spray dusters. The compositions can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the plant growth regulants.

The application of an effective amount of the active ingredients of this invention to the soil or growth media and/or plant is essential and critical for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In the foliar treatment for the modification of vegetative growth, the active ingredients are applied in amounts from about 1 to about 50 or more pounds per acre. In applications to soil for the modification of the growth of germinant seeds, germinative seeds, emerging seedlings and established vegetation, the active ingredients are applied in amounts from about 0.001 to about 25 or more pounds per acre. In such soil applications, it is desirable that the active ingredients be distributed to a depth of at least 0.2 inch. In selective pre-emergence phytotoxic applications the active ingredients are usually applied in amounts from about 0.001 to 5 pounds per acre. It is believed that one skilled in the art can readily determine from the teachings of this specification, including examples, the approximate application rate for any situation.

The terms "soil" and "growth media" are employed in the present specification and claims in their broadest sense to be inclusive of all conventional "soils" as defined in Webster's New International Dictionary, Second Edition, Unabridged (1961). Thus, the terms refer to any substance or media in which vegetation may take root and grow, and are intended to include not only earth but also compost, manure, muck, humus, sand and the like, adapted to support plant growth.

Although the invention is described with respect to specific modifications, the details thereof are not to be construed as limitations except to the extent indicated in the following claims.

The embodiments of the invention in which an exclusive property or privilege is claimed are defined as follows:

1. Substituted-pyridine selected from the group consisting of
   (1) pyridine bases,
   (2) acid addition salts of (1),
   (3) quaternary ammonium salts of (1), and
   (4) N-oxides of (1),
said pyridine base having the formula

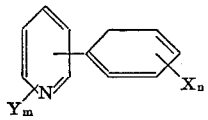

wherein X is selected from the group consisting of chlorine and bromine, $n$ is an integer from 3 to 5 inclusive, Y is selected from the group consisting of chlorine, bromine, hydroxyl and alkoxy of not more than 6 carbon atoms, and $m$ is an integer from 1 to 2, provided that when Y is hydroxyl or alkoxy, $m$ is an integer of 1.

2. Substituted-pyridine selected from the group consisting of (1) pyridine bases, (2) acid addition salts of (1), (3) quaternary ammonium salts of (1), and (4) N-oxides of (1), said pyridine base having the formula

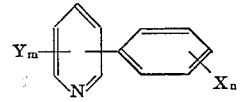

where the phenyl is attached to the pyridine nucleus at the 3- or 5-position and wherein X is selected from the group consisting of chlorine and bromine, $n$ is an integer from 3 to 5 inclusive, Y is selected from the group consisting of chlorine, bromine, hydroxyl and alkoxy of not more than 6 carbon atoms, and $m$ is an integer from 1 to 2, provided that when Y is hydroxyl or alkoxy, $m$ is an integer of 1.

3. Substituted-pyridine of claim 2 wherein X and Y are chlorine.

4. Substituted-pyridine of claim 2 wherein Y is alkoxy, X is chlorine and $n$ is an integer of 3.

5. Substituted-pyridine of claim 2 which is 2-chloro-3-(2′,4′,6′-trichlorophenyl) pyridine.

6. Substituted-pyridine of claim 2 which is 2-propoxy-5-(2′,4′,6′-trichlorophenyl) pyridine.

7. Substituted-pyridine of claim 2 which is 2-methoxy-5-(2′,4′,6′-trichlorophenyl) pyridine.

8. Substituted-pyridine of claim 2 which is 2-chloro-5-(2′,4′,6′-tribromophenyl) pyridine.

References Cited

Leditschke, C.A. 46: 11201–2 (1952).
Chase et al., C.A. 49: 1038–9 (1955).
Chase et al., C.A. 51: 2272–3 (1957).
Dickori et al., C.A. 55: 4493–4 (1961).
Comper, C.A. 54: 9954–5 (1960).
Balaban et al., C.A. 54: 13123–4 (1960).
Klingsberg, Pyridine & its Derivs: Part 2 (Interscience, N.Y., 1961), pp. 31–2, 117–8.

HENRY R. JILES, Primary Examiner

C. M. SHURKO, Assistant Examiner

U.S. Cl. X.R.

71—94; 260—294.8, 294.9, 295, 296, 297